Patented Mar. 13, 1923.

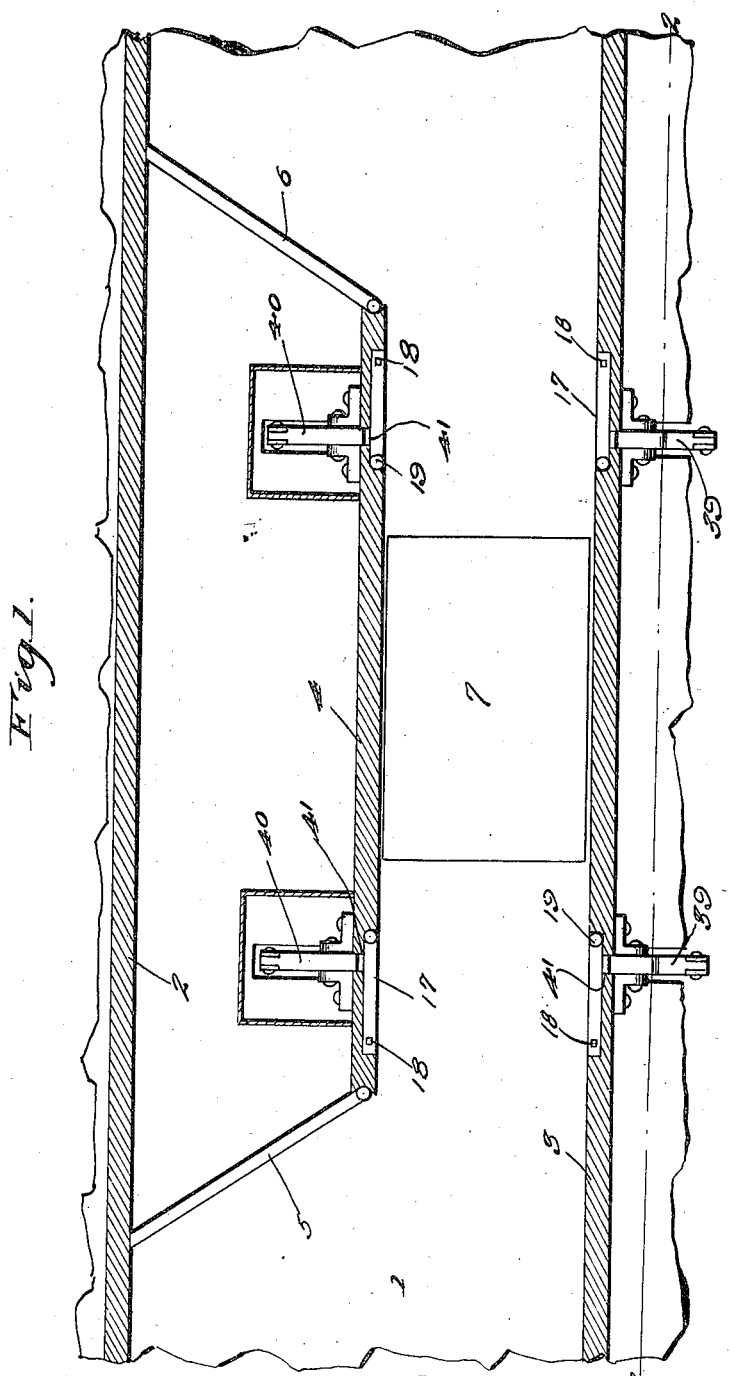

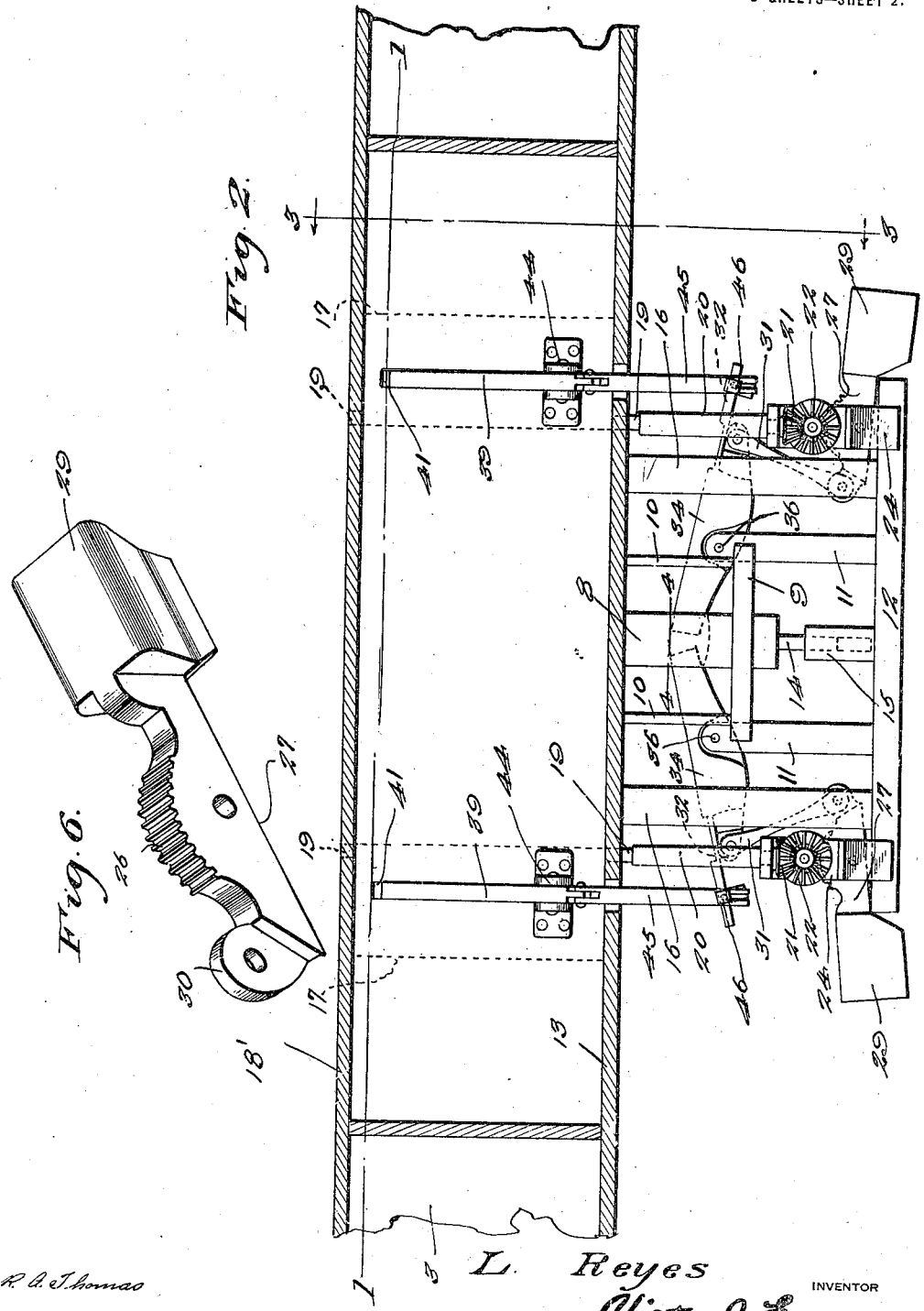

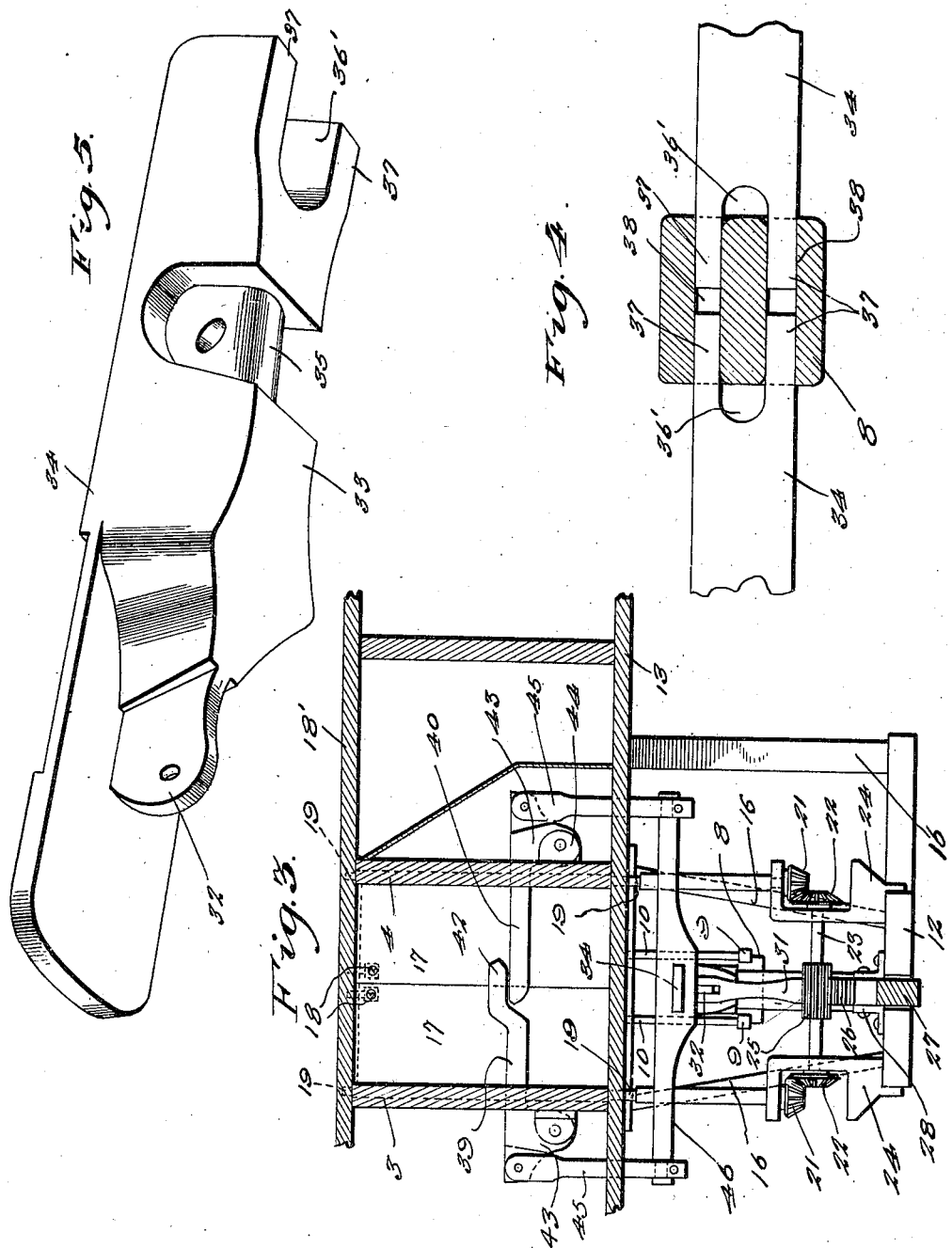

1,448,002

UNITED STATES PATENT OFFICE.

LORENZO REYES, OF BAKERSFIELD, CALIFORNIA.

TRAP.

Application filed July 24, 1922. Serial No. 577,091.

*To all whom it may concern:*

Be it known that I, LORENZO REYES, a citizen of the United States, residing at Bakersfield, in the county of Kern and State of California, have invented new and useful Improvements in Traps, of which the folowng is a specification.

My present invention has reference to a trap.

My improvement may be used either for trapping animals or humans, and has for its object to produce a comparatively simple but thoroughly effective means whereby a person treading on a platform in a passageway, will by the depression of the said platform cause doors to swing to closed position and effectively locked and barricaded to hold the person in the passage between the doors.

The drawings, which accompany and form part of this application, illustrate a satisfactory embodiment of the improvement reduced to practice, and wherein:—

Figure 1 is a horizontal sectional view aproximately on the line 1—1 of Figure 2.

Figure 2 is a sectional view on the line 2—2 of Figure 1.

Figure 3 is a sectional view on the line 3—3 of Figure 2.

Figure 4 is an enlarged sectional view on the line 4—4 of Figure 2.

Figure 5 is a perspective view of one of the levers.

Figure 6 is a similar view of one of the weighted cog members.

While my improvement may be successfully employed as an animal trap, it is primarily devised for use in banking houses or similar institutions.

In event of the employment of the improvement as an animal trap a top or closure is provided between the walls on which the trap doors are hinged.

Referring now to the drawings in detail, the numeral 1 designates a passageway in a bank or similar institution, and for distinction the walls of the passageway are indicated by the numerals 2 and 3 respectively. Centrally between the walls 2 and 3 there is a vertical partition 4, and hingedly secured to the ends of the partition there are doors 5 and 6 respectively. The doors are of a size to be swung to contact with either of the walls 2 or 3, and when in such position are designed to be locked. Normally the doors are swung into contacting engagement with the wall 3 which closes the passage between the partition and the wall 4, but when the trap is set the doors are swung and locked against the wall 2, as disclosed in Figure 1 of the drawings.

The floor of the passageway, between the partition 4 and the wall 3 is provided with an opening which is closed by a platform 7. The platform 7 is provided with a centrally arranged depending bar 8, the said bar, adjacent to its ends having secured thereon transverse strips 9 on which are secured rods 10 that are also connected to the platform 8. The strips 9 have their ends bifurcated to be received in standards 11 secured on a sub-floor 12 arranged a considerable distance below the floor 13 of the passageway 1. The bar 8 has its lower end provided with an extending stem 14 that is received in a socket 15 secured on the sub-floor 12. In this manner it will be noted that the frame constituting the elements connected with the platform 8 are guided for vertical movement toward or away from the sub-floor 12. Between the sub-floor 12 and the floor 13 there are suitable uprights 16 which serve as a brace for both the sub and the main floors.

Pivotally secured in suitable depressions in the partition 4 and in the wall 3 to the opposite sides of the platform 7 there are doors 17 respectively. Each of these doors carries a self-closing spring influenced lock 18 designed to be received in a suitable keeper in the ceiling 18 of the passageway when the said doors are swung toward each other. The doors, as disclosed in Figure 1 of the drawings are arranged in opposed pairs, and when swung to closed position are designed to close the passage provided between the partition 4 and the wall 3.

The pivots for the doors 17 are indicated by the numeral 19, each of the said pivots comprising a rod which is journaled in bearing openings in the ceiling 18, the floor 13 and which is guided through a bearing sleeve 20 supported from the sub-floor 15. The pivots 19 are in the nature of shafts, each of the same having its lower end provided with a pinion 21, each pinion being in mesh with a beveled gear 22, the said beveled gear being mounted on shafts 23. The shaft 23 is journaled in bearing brackets 24 secured to the sub-floor 12 and to the lower ends of the tubular bearings 20 for the pivots 19. Each shaft 23 has centrally keyed thereon a gear wheel 25, and each gear wheel is in mesh with the teeth of a curved rack 26 provided centrally on a member 27. Each member 27 is pivotally secured between angle brackets 28 that are supported on the sub-floor 12, the said members 27 passing through suitable openings in the said sub-floor. The members 27 have one of their ends weighted, as at 29, and their other ends provided with ears 30. To each ear there is pivotally secured a link 31, and each link is pivoted to a lug 32 provided upon the base portion 33 of a lever 34. The base portions 33 of the levers 34 are reduced from the opposed sides and lower surface thereof a distance from one end of the said levers to provide what may be termed ribs 35, and these ribs are pivotally secured as at 36 to the upper bifurcated ends of the uprights 11. The confronting ends of the opposed pairs of levers 34 are bifurcated, as at 36′ and the fingers 37 provided by the bifurcation are received in transverse slots 38 provided in the said bar 8, as disclosed in Figures 2 and 4 of the drawings. By this construction, it will be apparent that when the platform 7 is depressed the levers 34 will be swung by contact with the bar 8 to swing the links 31 upwardly, to cause the rack member 27 to turn the pivots 19, and swing the doors 17 to closed position, it being understood that the doors 17 will automatically lock when closed.

To more effectively secure the doors in closed position, I provide barriers therefor. The barriers comprise bars 39 and 40 respectively, the same being normally sustained in vertical position to the rear of the doors 17, the said bars being arranged for movement through slots 41 in the wall 3 and partition 4. The bar 39 has its end offset, as at 42 whereby to overlie the bar 40 when the bars are brought to operative position. Each bar has one of its edges provided with a lug 43, each lug being pivotally secured to brackets 44 respectively which are in turn secured to the outer faces of the wall 3 and partition 4. The bars 39 and 40 have their ends opposite their pivots reduced and to these reduced portions there are secured links 45 that pass through suitable openings in the floor 13. The opposed links 45 are loosely connected to cross pieces 46 which may be either integrally formed with or secured on the ends of the levers 34. The connection between the cross pieces 46 and the links is such that the doors 17 will be swung to closed position before the bars 39 and 40 are brought to barrier position. Normally the doors 5 and 6 are swung and may be locked against the wall 2 so that the passage between the wall 2 and partition 4 is closed. When the device is designed to catch an intruder, the doors 5 and 6 are swung against the wall 2 and preferably locked thereagainst. This leaves the passage between the wall 3 and the partition 4 clear. An intruder taking this passage and treading on the platform 7 will depress the said platform, causing the pairs of doors 17 to be swung toward each other, locked and barricaded so that the intruder is held in the passage between the said doors. The barriers are arranged against the outer faces of the doors 17, and the platform is not depressed sufficiently to permit of the intruder gaining access to the mechanism therebelow, so the intruder is effectively trapped and cannot be released until the locking means 18 are brought to unlocking position and the barriers 39 and 40 are swung to non-obstructing position.

It is thought that the foregoing description, when taken in connection with the drawings will fully set forth the construction and advantages of the improvement to those skilled in the art to which such inventions relate, but it is to be stated that the nature of the invention is such as to render the same susceptible to such changes and modifications as fall within the scope of what I claim.

Having described the invention, I claim:—

1. In a trap, a passageway, a partition centrally therein, doors on the ends of the partition susceptible to swinging against and being locked to either of the walls of the passageway, opposed pairs of doors in the partition and one of the walls, means automatically locking the doors when swung together in closed position, a platform let in the floor between the opposed pairs of doors, means actuated on the depression of the platform for swinging the last mentioned doors to closed position.

2. In a trap, a passageway, a partition centrally therein, doors on the ends of the partition susceptible to swinging against and being locked to either of the walls of the passageway, opposed pairs of doors in the partition and one of the walls, means automatically locking the doors when swung together in closed position, a platform let in the floor between the opposed pairs of doors, means actuated on the depression of the platform for swinging the last mentioned doors to closed position, and means also actuated by said platform for barricading the doors when closed.

3. In a trap, a passageway, a partition centrally arranged therein, doors for closing the passage between the partition and the walls of the passageway, other doors arranged in opposed pairs and pivotally supported respectively in the partition and in one of the walls of the passageway, means on said doors for locking the same when swung toward each other in closed position, a platform susceptible to vertical movement let in the floor of the passageway between the last mentioned doors, means actuated on the depression of the platform for influencing the pivots of the last mentioned doors to swing the latter to closed position, and means also actuated by such movement of the platform for barricading the doors when closed.

4. In a trap, a passageway having a central partition therein, doors for closing the passage between the partition and the walls of the passageway, pivotally supported doors let in the partition and one of the walls of the passageway, said doors being disposed in opposed pairs and being provided with means for locking the same when in closed position, a vertically movable platform let in the floor of the passageway between the partition and the last mentioned wall of the passageway, guide means therethrough, pivotally supported levers loosely engaging the platforms, weighted means for holding the levers in one position and the platform on a level with the floor of the passageway, means actuated by the swinging of said levers on the depression of the platform for turning the pivots of the last mentioned doors to bring said doors to closed position, and means also actuated by said levers for barricading the doors in closed position.

5. In a trap, opposed walls providing a passage therebetween, pivotally supported doors let in the walls, said doors being arranged in opposed pairs and having means for automatically locking the same when swung together to closed position, a platform movable through the floor between the walls and disposed inward of the doors, a bar depending from the platform, guide means below the floor for the platform, pivotally supported levers below the platform having a contacting engagement with the bar, pivotally supported weighted means, links connecting said means with said levers, whereby the levers are disposed to hold the platform level with the floor, means on the weighted means influenced by the swinging of the levers on the depression of the platform for turning the pivots of said doors to bring the doors to closed position, pivotally supported bars swingable through the walls arranged outward with respect to the doors, and means actuated by the swinging of the levers for swinging the bars to barricading position with respect to the outer faces of the doors.

In testimony whereof I affix my signature.

LORENZO REYES.